Oct. 8, 1968  D. R. NELSON  3,404,865
CRYOGENIC VALVE
Filed April 29, 1966
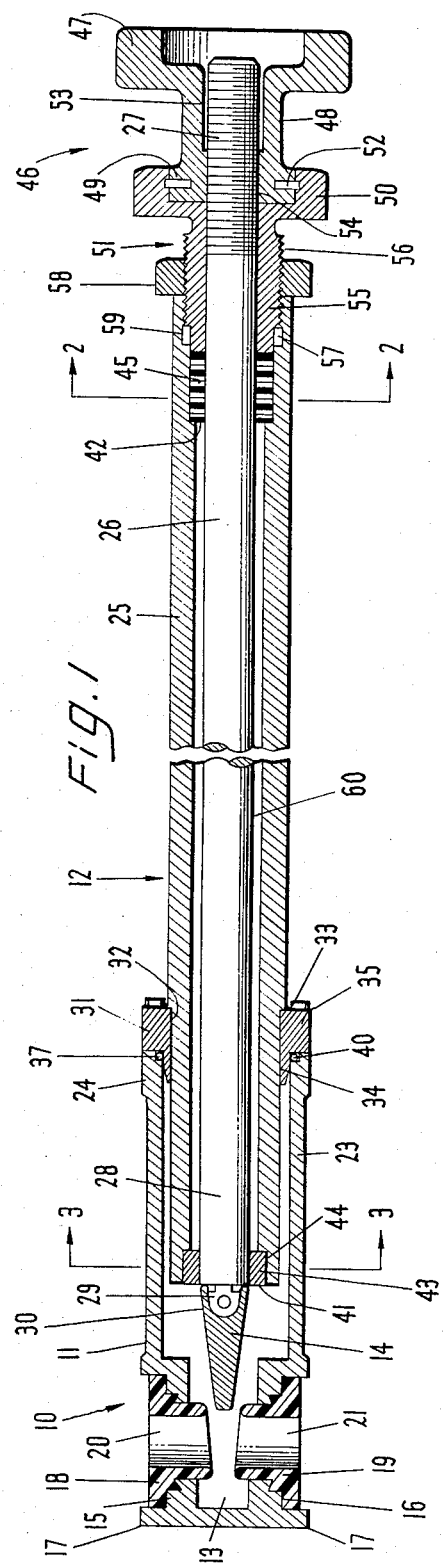
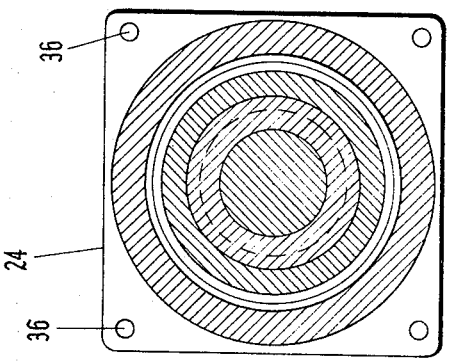
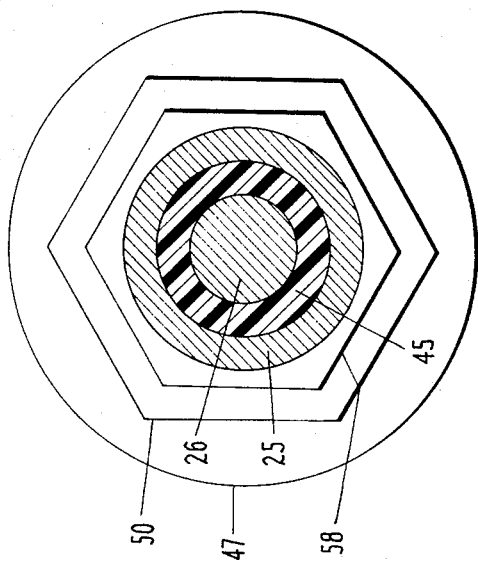
INVENTOR
Donald R. Nelson
BY
Wolf, Greenfield & Hieken

United States Patent Office 3,404,865
Patented Oct. 8, 1968

3,404,865
CRYOGENIC VALVE
Donald R. Nelson, Worcester, Mass., assignor to Goddard Industries, Inc., Worcester, Mass., a corporation of Massachusetts
Filed Apr. 29, 1966, Ser. No. 546,450
7 Claims. (Cl. 251—214)

ABSTRACT OF THE DISCLOSURE

A cryogenic gate valve comprising a body member having an upper cylindrical end. An elongated, cylindrical stem tube projects into the upper cylindrical end and is secured to it along an annular portion by an annular ring or bonnet cap fitted into a shoulder in the stem tube and sealed by an annular weld. A stem is supported in spaced relation to the stem tube by special journaling means at the upper and lower ends. The stem tube is also spaced from the inner surface of the cylindrical end except by the means sealing the stem tube to the cylindrical end.

---

The present invention relates to a gate valve and, more particularly, to a gate valve which is particularly useful in handling cryogenic materials.

Most presently available, high-performance valves designed for handling cryogenic materials are quite expensive to manufacture. These valves are expensive because of the very close tolerance requirements in their design, and because the designs heretofore available require the use of relatively expensive materials. The present invention provides a cryogenic valve design that combines high performance at a less expensive price than those heretofore available. The present invention also provides an improved gate valve design having a restricting mechanism which automatically controls the flow of volatilizing fluids in cryogenic temperature ranges through various portions of the valve construction. A further object of this invention is to provide an improved bonnet construction for valves designed to handle cryogenic materials.

A further object of this invention is to provide a gate valve that is easy to operate and maintain and which will efficiently and effectively control the flow of cryogenic fluids over a wide range of pressures.

In the present invention there is provided a gate valve having a body member at one end and an integrally formed cylindrical portion at the other end. Spaced, aligned seat members defining a flow passage are formed in the one or lower end. A stem is coaxial with and extends through a stem tube with one end of the stem extending into the cylindrical end of the body member, and carrying a wedge adapted to close the flow passage between the aligned seat members. The stem is coaxially supported in the stem tube by a ring journaling the stem at the end adjacent the wedge and seated in a counterbore at the corresponding end of the stem tube. The other end of the stem is supported by a packing material suitably supported and journaled at its outer periphery in a counterbore at the other end of the stem tube.

These and other objects and advantages of the present invention will be more clearly understood when considered in conjunction with the accompanying drawings in which;

FIG. 1 is a longitudinal cross-sectional view of a valve construction embodying the invention;

FIG. 2 is a cross-sectional view taken along the line 2—2 of FIG. 1; and

FIG. 3 is a cross-sectional view taken along the line 3—3 of FIG. 1.

The valve illustrated in the accompanying drawings includes a body member 10 having a body 11 and a bonnet 12. Within the body 11 there is a chamber 13 which provides a flow passage through the body. The chamber 13 is shaped to receive a valve member or gate 14. Counterbored or stem openings 15 and 16 extend inwardly from faces 17 of the body member into the chamber 13. Seat members 18 and 19 have inwardly projecting surfaces that conform with the counterbored or stem members 15 and 16 respectively. Cylindrical passages 20 and 21, respectively in the seat members 18 and 19, are aligned with one another with the facing ends of these seat members 18 and 19 lying respectively in planes that define an acute angle. The seat members may be formed of a suitable metal or plastic material such as nylon, Teflon, Kel-F or the like. The seat members 18, 19 and the wedge 14 and their interrelationship with one another may be of conventional design, and may have the form of the seat members and wedge illustrated in Patent No. 3,179,372 or any other similar arrangement. Extending upwardly from the lower end of the body member 10, is a cylindrical upper end 23. This cylindrical upper end 23 is integrally formed with the lower end of the body member 10 and terminates at its upper end in a rectangularly shaped, outwardly flared flange 24. The bonnet 12 includes a stem tube 25 and a stem 26. The stem 26 is an elongated cylindrical member which is threaded at its upper end 27 and which extends well into the cylindrical upper end 23 of the body member 10 at its lower end 28. The wedge 14 is secured to the lower end 28 of the stem 26 by suitable means such, for example, as a semispherical end and socket arrangement with the semispherical end 29 secured to the lower end 28, and a socket 30 formed in end of the wedge 14. The stem tube 25 through which the stem 26 extends is secured to an upper opening in the cylindrical upper end 23 by a bonnet cap or retaining ring 31. The bonnet cap 31 is an annular flange through which the stem tube 25 projects. The ring 31 is closely fitted to a shoulder section 32 formed on the outer surface of the stem tube 25 along an annular portion intermediate its ends. The cap 31 and stem tube 25 are permanently secured together by welding these two elements together along the annular junction line 33. The cap 31 has an inner sleeve portion 34 which fits closely to the outer surface of the stem tube 25 and which extends between the stem tube 25 and the cylindrical upper end 23. The outer or upper end 35 of the cap 31 is rectangular in shape and is preferably dimensioned to the shape and size of the flange 24. The flange 24 and the outer end 35 of the cap 31 are secured together by screws 36. The extreme upper end of the cylindrical end 23 is formed with a counterbore 37 within which is positioned a sealing ring 40 with the ring 40 effectively sealing the junction between the cylindrical upper end 23 and the ring 31.

The stem 26 is journaled in spaced relation to the stem tube 25 at its ends by suitable journaling means 41 and 42. Journaling means 41 comprises an annular ring which functions both as a bearing and as a restricting device. This ring 43 may be held in position by welding, force fit or by upsetting the bore formed on the inner surface at the lower end of the stem tube 25. The inner surface of the ring 43 is closely fit to and supports the stem 26 at its lower end. Preferably, as tight a fit should be provided between the inner surface of the ring 43 and the stem 26 consistent with the ability to slide the stem 26 longitudinally with respect to the ring 43 on moving the handle controlling the stem 26, and without dislodging the ring 43 from the counterbore in the stem tube 25 at cryogenic or ambient temperatures.

Journaling means 42 comprises an annular packing of sealing material formed, for example, of Teflon. This packing may comprise a series of annular rings 45 having a cross-sectional configuration in the shape of a V so that longitudinal compression of the stacked rings 45 will exert a sealing pressure inwardly toward the stem 26. These packing rings 45 are positioned within a counterbore formed on the inner surface of the stem tube 25 near its upper end.

The handle construction generally illustrated at 46 comprises a hand grip 47, a continuous shank 48, and a lower outwardly flared flange 49. The flange 49 is positioned within a recess in the upper outwardly extending flange 50 of the sleeve member 51. The flange 49 is freely rotatable within the flange 50 and is secured in this flange against axial movement by a retaining ring 52 which extends radially from the flange 49 into a recess within flange 50. The shank 48 is formed with a longitudinally extending opening 53 which is threaded at its lower end 54 with the threads in this lower end 57 having an outer diameter slightly less than the inner diameter of the stem tube 25. The threads on the outer surface 56 engage the threads of lock nut 58 and threads formed on the walls of a second counterbore 59 at the upper end of stem tube 25. Sleeve member 51 is threaded into the upper member of stem tube 25 where it is held in tight engagement by the lock nut 58 with the lower end 57 of the sleeve member in pressing engagement with the packing rings 45. Rotation of the hand grip 47 causes axial movement of the stem 26 thereby causing wedge 14 to move to and from a sealing position between the seat members 18 and 19.

The valve may be formed of a variety of material but preferably, and for purposes of economy, the body members should primarily be formed of brass while the stem and stem tube are preferably formed of a stainless steel. The seat members 18 and 19 are preferably formed of a metal or deformable plastic material. The hand grip 47 may be formed of plastic, such as nylon; and the packing rings 45 may be also formed of a plastic, such as Teflon.

The ring 43 is formed of brass, bronze, or other bearing material and functions both as a bearing for the stem 26 and as a restricting device to control the flow of cryogenic fluids from the chamber 13 to the space 60 between the stem 26 and stem tube 25. Only a limited amount of fluid or gaseous material can penetrate into space 60 between the stem 26 and the ring 43 from chamber 13. However, because of the inherent difficulties in effecting seals between moving parts with respect to the flow of fluids at cryogenic temperatures, the constricted nature of the space between the brass ring 43 and the stem tube 26 is utilized and functions as a restricting valve or device. In this arrangement, the normally elevated temperatures near the handle end of the valve cause fluids within the space 60 to rise in temperature and thereby vaporize. This vaporized material generates sufficient pressure in the space 60 to restrict the amount of fluid which might flow through the narrow space defined by the ring 43 and the stem 26, thus effectively keeping the level of liquid at cryogenic temperatures in this space at a position relatively low in the space 60.

What is claimed is:

1. A cryogenic gate valve comprising a body member having a lower end with spaced aligned seat members defining a flow passage and an upper cylindrical end integral with said lower end, said body member having openings only through said seat members and through the upper end of said upper cylindrical end,
an elongated cylindrical stem tube having one end extending through said opening in and terminating within said upper cylindrical end,
means sealing said stem tube to said upper cylindrical end at said opening in said upper cylindrical end along an annular portion remote from the ends of said stem tube with that part of the outer wall of said stem tube projecting beyond said portion into said upper cylindrical end in spaced annular relation to the inner surface of said upper cylindrical end,
a stem coaxial with and extending through said stem tube,
a wedge positioned in said body member and secured to one end of said stem for movement therewith to and from a position intermediate and in sealing relation with said aligned seat members,
journaling means at the ends of said stem supporting said stem in spaced relation to said stem tube and defining a space therebetween, said journaling means including means forming a counterbore within said one end of said stem tube, a ring secured in said counterbore with the outer annular surface of said ring in tight facing relation to the annular wall of said counterbore, and inner annular surface of said ring in close longitudinal movement of said stem.

2. A cryogenic gate valve as set forth in claim 1 wherein said journaling means includes a counterbore formed at the other end of said stem tube, annular packing material seated in said last-mentioned counterbore and having an inner annular surface in sliding facing relation to said stem.

3. A cryogenic gate valve as set forth in claim 2 wherein said packing material comprises a plurality of plastic rings.

4. A cryogenic gate valve as set forth in claim 3 wherein a portion of said handle means engages and maintains a force against one end of said packing material.

5. A cryogenic gate valve as set forth in claim 1 having an annular ring positioned at the upper end of said cylindrical end and a weld along a continuous line securing said stem tube to said ring.

6. A cryogenic gate valve as set forth in claim 1 wherein said stem tube is formed with an annular shoulder intermediate its ends, said means sealing said stem tube to said upper cylindrical end at said opening in said upper cylindrical end comprising
an annular ring abutting said annular shoulder, and
an annular junction weld interconnecting said stem tube and said annular ring.

7. A valve as set forth in claim 6 wherein said annular ring is formed with an integral inner sleeve extending within said annular portion with the inner surface of said inner sleeve facing said stem tube, said upper cylindrical end formed with an annular counterbore and a sealing ring positioned in said counterbore and sealing the junction between said cylindrical upper end and said annular ring.

References Cited

UNITED STATES PATENTS

| | | | |
|---|---|---|---|
| 2,254,427 | 9/1941 | Hehemann | 251—367 |
| 2,321,597 | 6/1943 | Hobbs | 251—267 |
| 2,571,560 | 10/1951 | Gall | 277—112 X |
| 2,621,015 | 12/1952 | MacGregor | 251—267 X |
| 2,787,439 | 4/1957 | Bredtschneider | 251—329 |
| 3,322,142 | 5/1967 | Baumann | 137—334 |

ARNOLD ROSENTHAL, *Primary Examiner.*